(12) United States Patent
Burr et al.

(10) Patent No.: US 8,645,856 B1
(45) Date of Patent: Feb. 4, 2014

(54) TICKER FOR INTERNET CLIENT

(75) Inventors: Ronald Burr, Agoura, CA (US);
Marwan Zebian, Agoura Hills, CA (US)

(73) Assignee: NetZero, Inc., Woodland Hills, CA (US)

( * ) Notice: Subject to any disclaimer, the term of this patent is extended or adjusted under 35 U.S.C. 154(b) by 3032 days.

(21) Appl. No.: 09/632,768

(22) Filed: Aug. 4, 2000

(51) Int. Cl.
*G06F 3/048* (2013.01)

(52) U.S. Cl.
USPC .......................................... 715/774

(58) Field of Classification Search
USPC .......... 345/733, 738, 774, 773, 760; 715/738, 715/760, 774
See application file for complete search history.

(56) References Cited

U.S. PATENT DOCUMENTS

| | | | |
|---|---|---|---|
| 5,105,184 A | 4/1992 | Pirani | |
| 5,404,505 A | 4/1995 | Levinson | |
| 5,446,919 A | 8/1995 | Wilkins | |
| 5,724,424 A | 3/1998 | Gifford | |
| 5,740,549 A | 4/1998 | Reilly | |
| 5,761,662 A | 6/1998 | Dasan | |
| 5,909,589 A | 6/1999 | Parker | |
| 5,918,014 A | 6/1999 | Robinson | |
| 5,959,621 A * | 9/1999 | Nawaz et al. | 345/733 |
| 6,014,502 A * | 1/2000 | Moraes | 709/219 |
| 6,085,229 A | 7/2000 | Newman | |
| 6,119,098 A * | 9/2000 | Guyot et al. | 705/14 |
| 6,141,699 A | 10/2000 | Luzzi | |
| 6,182,098 B1 * | 1/2001 | Selker | 715/202 |
| 6,216,141 B1 * | 4/2001 | Straub et al. | 707/513 |
| 6,292,813 B1 * | 9/2001 | Wolfe | 707/513 |
| 6,313,880 B1 * | 11/2001 | Smyers et al. | 348/552 |
| 6,327,574 B1 | 12/2001 | Kramer | |
| 6,392,664 B1 * | 5/2002 | White et al. | 345/717 |
| 6,421,694 B1 * | 7/2002 | Nawaz et al. | 707/526 |

FOREIGN PATENT DOCUMENTS

WO    WO 98/35300    8/1998

\* cited by examiner

*Primary Examiner* — Thanh Vu
(74) *Attorney, Agent, or Firm* — SoCal IP Law Group LLP; Mark A. Goldstein

(57) ABSTRACT

In accordance with the present invention, there is provided an Internet client window with a ticker display area. The ticker display area displays moving hypertext ticker data associated with selected ticker types and ticker fields. Ticker data may be provided by third party suppliers such as sponsors. Activation of the hypertext ticker data results in a display of related information. The ticker data may move in various directions through the ticker display area at various speeds, and be displayed in various formats, all depending on the ticker types and ticker fields with which the ticker data is associated, upon the number of ticker types being simultaneously displayed, and upon other factors including user preferences or selections. The Internet client window includes various other navigational and informational data, links, and application-invoking buttons.

14 Claims, 8 Drawing Sheets

TICKER FOR INTERNET CLIENT

NOTICE OF COPYRIGHTS AND TRADE DRESS

A portion of the disclosure of this patent document contains material, which is subject to copyright protection. This patent document may show and/or describe matter, which is or may become trade dress of the owner. The copyright and trade dress owner has no objection to the facsimile reproduction by any one of the patent disclosure, as it appears in the Patent and Trademark Office patent files or records, but otherwise reserves all copyright and trade dress rights whatsoever.

RELATED APPLICATION INFORMATION

This application is related to the following applications which are incorporated herein by reference:

Ser. No. 09/265,512 filed Mar. 9, 1999 entitled, "Network Data Distribution Based upon User-Specific Qualities;" and Ser. No. 09/348,411 filed Jul. 7, 1999 entitled, "Independent Internet Client with Ad Display Capabilities."

BACKGROUND OF THE INVENTION

1. Field of the Invention

The present invention relates to the presentation of ticker data on an Internet client, and the use of ticker data as hyperlinks to related web sites.

2. Description of Related Art

Using PCs or other client devices to access Internet data and web sites is common and well-known in the art. Some of the most popular web sites provided organized information relating to finance, sports, and various types of news.

Stock tickers have been in use for many years in financial businesses, and have also become available on some web sites. These web-based stock tickers display a scrolling series of stock symbols and corresponding quotes within the browser display of the client device. Typical stock tickers, both web-based and otherwise, have fixed content (e.g., show all stocks for a given exchange) and characteristics (e.g., speed, size, color, location, orientation, etc.). Both the content and characteristics are typically predetermined by the provider of the ticker (e.g., the respective web server), which can be the OSP server 130 or a web server 150 selected by the OSP. A person viewing such a stock ticker must view a series of undesired stock quotes prior to viewing desired stock quotes.

The utility of a stock ticker has suggested other types of "tickers." For example, a well-know ticker in New York's Times Square displays current news. Many public spaces also have similar devices. However, these tickers generally have not lent themselves well to uses other than for displaying stocks. Generally, the small space, limited appearance characteristics and lack of control by the audience limit their utility and make them undesirable. Thus, these non-stock tickers are uncommon.

In certain situations wherein a significant amount of information is displayed in a predetermined sequence, if the person viewing the information accesses the ticker at an inopportune time, or happens to get distracted at a certain moment, the person may be required to wait a relatively long time until the desired information again passes by on the ticker. This might occur, for example, if a person is waiting to see a stock quote for a stock having a ticker symbol beginning with "B," but the stock ticker displays the quotes in alphabetical order and is currently on the Cs.

Another limitation of most tickers is that the information provided is of a very limited nature. Stock tickers are useful primarily to those people who are skilled at reading the "code" of stock symbols and prices. This need to compress large amounts of information in a small and time-limited space result in non-stock tickers often displaying unintelligible information. Because the person viewing the ticker usually has no control over the display, the person may catch a glimpse of information of interest, but cannot obtain information which has passed, or supplemental or related information.

Accordingly, there exists a need for a ticker which allows a viewer to customize the content and characteristics thereof, as well as easily access information related to the ticker information.

SUMMARY OF THE INVENTION

In accordance with one aspect of the present invention, there is provided an Internet client display with a ticker display area. The ticker display area displays moving hypertext ticker data associated with selected ticker types and ticker fields. Ticker data may be provided by third party suppliers, such as sponsors. Activation of the hypertext ticker data results in a display of related information. The ticker data may appear to move in various directions through the ticker display area at various speeds, and be displayed in various formats, all depending on the ticker types and ticker fields with which the ticker data is associated, upon the number of ticker types being simultaneously displayed, and upon other factors including user preferences or selections. According to another aspect of the invention, a ticker display is integrated with an Internet client to provide unique benefits.

Still further objects and advantages attaching to the system and to its use and operation will be apparent to those skilled in the art from the following particular description.

DESCRIPTION OF THE DRAWINGS

Further objects of this invention, together with additional features contributing thereto and advantages accruing therefrom, will be apparent from the following description of an embodiment of the present invention which is shown in the accompanying drawings with like reference numerals indicating corresponding parts throughout and which is to be read in conjunction with the following drawings, wherein.

These and additional embodiments of the invention may now be better understood by turning to the following detailed description wherein an illustrated embodiment is described.

DETAILED DESCRIPTION OF THE INVENTION

Throughout this description, the embodiments and examples shown should be considered as exemplars, rather than limitations on the apparatus and methods of the present invention.

The System of the Invention

The system of the invention enables a person viewing to view and control ticker data in a ticker display area within an Internet client window, and to hyperlink to web sites associated with the ticker data by activating the selected ticker data itself.

By "client device" it is meant a computer or other device having a display, which receives data from a second device over a network. Typically the second device is a web server, and the network is the Internet, but that is not required. "Hyperlinking" refers generally to requesting, receiving, and displaying new data at the client device, typically by clicking on or otherwise activating hypertext or an active region of the display. Hyperlinking includes, for example, situations wherein the new data replaces previously-displayed data, or the new data is framed within a new or existing window or frame managed by a single browser application, or the new data is displayed in a new window or frame within a second browser application. The new data may be displayed in a Internet client window.

Figure 1:
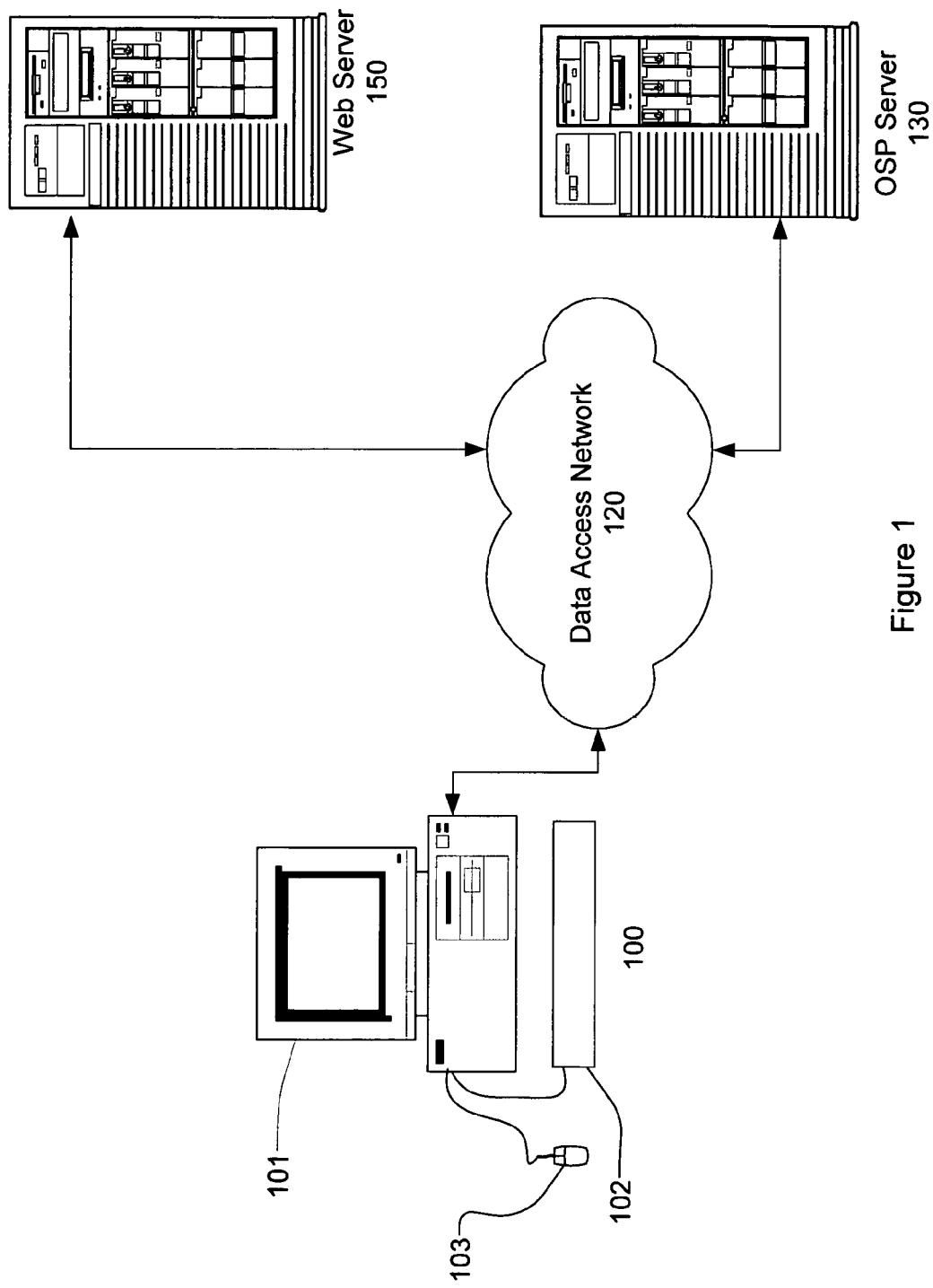
FIG. 1 is a block diagram of a network data distribution system in accordance with one embodiment of the present invention.

Referring now to FIG. 1, there is shown a block diagram of a network data distribution system in accordance with the invention. FIG. 1 includes a local device 140, a data access network 150, an On-line Service Provider (OSP) server 160, and a web server 170. The local device 140, the data access network 150 and the OSP server 160 comprise the network data distribution system. The local device 140 is provided online service (e.g., Internet access or intranet access) to the network data distribution system under control of the OSP server 160. An online service provider controls the OSP server 160.

The local device 140 comprises a client which is configured to access the OSP server 160 via the local access network 120. The client computer may be, for example, a PC running a Microsoft Windows operating system. The local device 140 includes an output device 141 such as a display, and an input device 142 such as keyboard, and/or pointing device 143 (e.g., mouse, track ball, light pen, or data glove). The local device 140 may also be, for example, an Internet appliance, network computer (NC), or an appropriately Internet-enabled device such as a portable digital assistant (PDA), mobile phone, refrigerator, etc. The particular type of device of the local device 140 is not considered to be important so long as the local device 140 can provide some measure of individual user interactivity with an online service.

The data access network 150 provides lower layer network support for the local device 140 to interact with an online service, including the OSP server 160 and the web server 170. The data access network 150 typically comprises a common or private bi-directional telecommunications network (e.g., a public switched telephone network (PSTN), a cable-based telecommunication network, a LAN, a WAN, a wireless network), coupled with or overlaid by a TCP/IP network.

The web server 170 may be of the type known in the art and has the ability to serve web pages to the local device 140, as requested in the manner known in the art. It should be appreciated that the web server 170 is representative of any source of content available to the local device 140 as described herein. Thus, for example, the web server 170 could be accessible from the Internet, or it could be a part of an intranet and represents any number of servers.

The OSP server 160 is typically a computer system, such as a server computer. Alternatively, the OSP server 160 may be considered to represent a number of physical devices which as a group provide the indicated network services.

Figure 2:
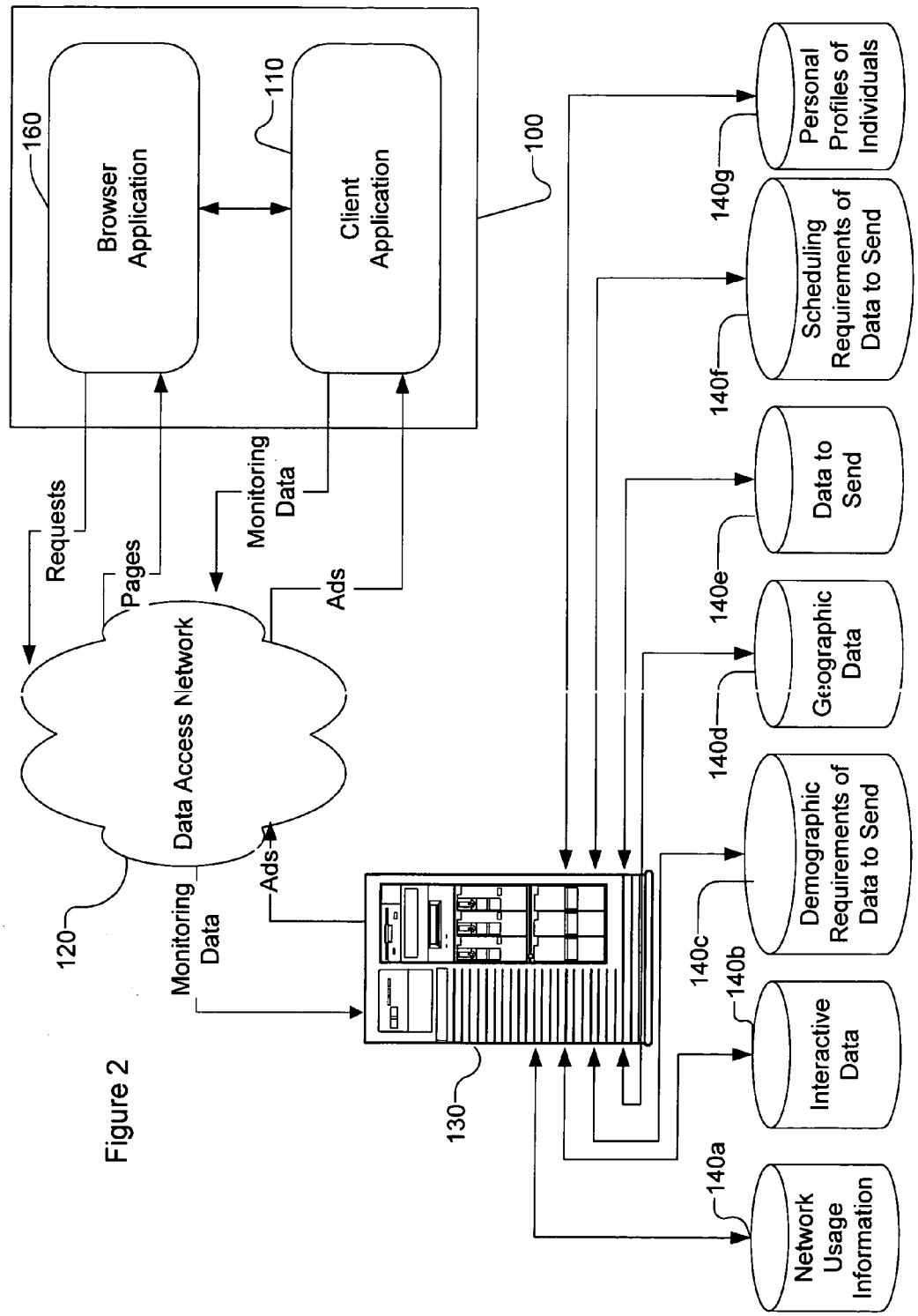
FIG. 2 is a second block diagram of a network data distribution system in accordance with the present invention.

Referring now to FIG. 2, there is shown a block diagram of a network data distribution system of an online service in accordance with the present invention. The system comprises a Internet client application 110, the data access network 120, the OSP server 130 and data stores 140a-g (collectively, 140). A browser application 160 is also shown. A "browser application" is software which provides interactive utilization of hypertext objects located on a network, such as web pages on the Internet. The Internet client application 110 is a program operative on local device 100, such as an independent application program or a DLL. The Internet client application 110 retrieves certain network data, displays certain network data, transmits geographic location data, transmits interactive user data, transmits network usage data and transmits personal profile information as described below. The Internet client application 110 also sets up and provides access to the online service. The data stores 140 store and provide this geographic information data 140d, network usage data 140a, interactive usage data 140b, personal profile information 140g, data to be sent 140e, schedule for transmitting data 140f and demographics for transmitting data 140c.

The browser application 160, such as Microsoft Internet Explorer or Netscape Navigator is preferably installed on the local device 100. When the local device 100 is connected to the web server 150 through the data access network 120, the user of the local device browses the web server 150 from the local device 100 using the browser application. The browser application itself need not be stored on the local device 100. The important aspect is that the user, from the local device 100, can exercise control over what web pages are requested and thus displayed by the local device 100.

Each time a user uses the local device 100 to connect to the online service, the Internet client application 110 and the OSP server 130 establish a session. In this session, the Internet client application 110 transmits certain information regarding the user of the local device 100 and his use of the local device 100 while connected to the online service. The OSP server 130, on the other hand, uses the information from the Internet client application 100 to determine information which should be sent to the Internet client application 110. Preferably, the information from the Internet client application 110 is used by the OSP server 130 to select advertisements which the local device 100 should display. The Internet client application 110 then causes these advertisements to be displayed on the local device's output device 101.

The information from the Internet client application 110 regarding the user preferably includes geographic data and personal profile information. Geographic data indicating the user's current location preferably is sent from the Internet client application 110 to the OSP server 130, which then stores the geographic data in the data store 140d. This geographic data can be something simple, like a phone number. The user preferably provides personal profile information on a periodic basis which is stored in the data store 140g and used by the OSP server 130. This information consists of (but is not limited to) things such as: age, sex, marriage status, home address and personal interests.

The information regarding the user's use of the local device 100 includes email usage, web usage and advertisement click-throughs. The user's interactions and feedback with the web server 150 provided through the browser application 160 are preferably captured by the Internet client application 110, analyzed by the OSP server 130 and stored in the data store 140b. This includes the user's feedback and responses to the data delivered to the browser application 160. The user's activities on the web server 150 provided through the browser application 160 are preferably captured by the Internet client application 110, analyzed by the OSP server 130 and stored in the data store 140a. This includes the type of network data the user requests and accesses. This data is preferably summarized and classified into multiple demographic profiles.

The data to be sent to users preferably has scheduling requirements that dictate when it should be sent. These scheduling requirements include (but are not limited to): frequency, maximum number of times to send to an individual, minimum number of times to send to an individual, time of day to send, and first and last days to send. The data to be sent to users can have demographic requirements that dictate to whom it should be sent. These include (but are not limited to): personal profile, interactive data, network usage information and geographic location.

Figure 3:
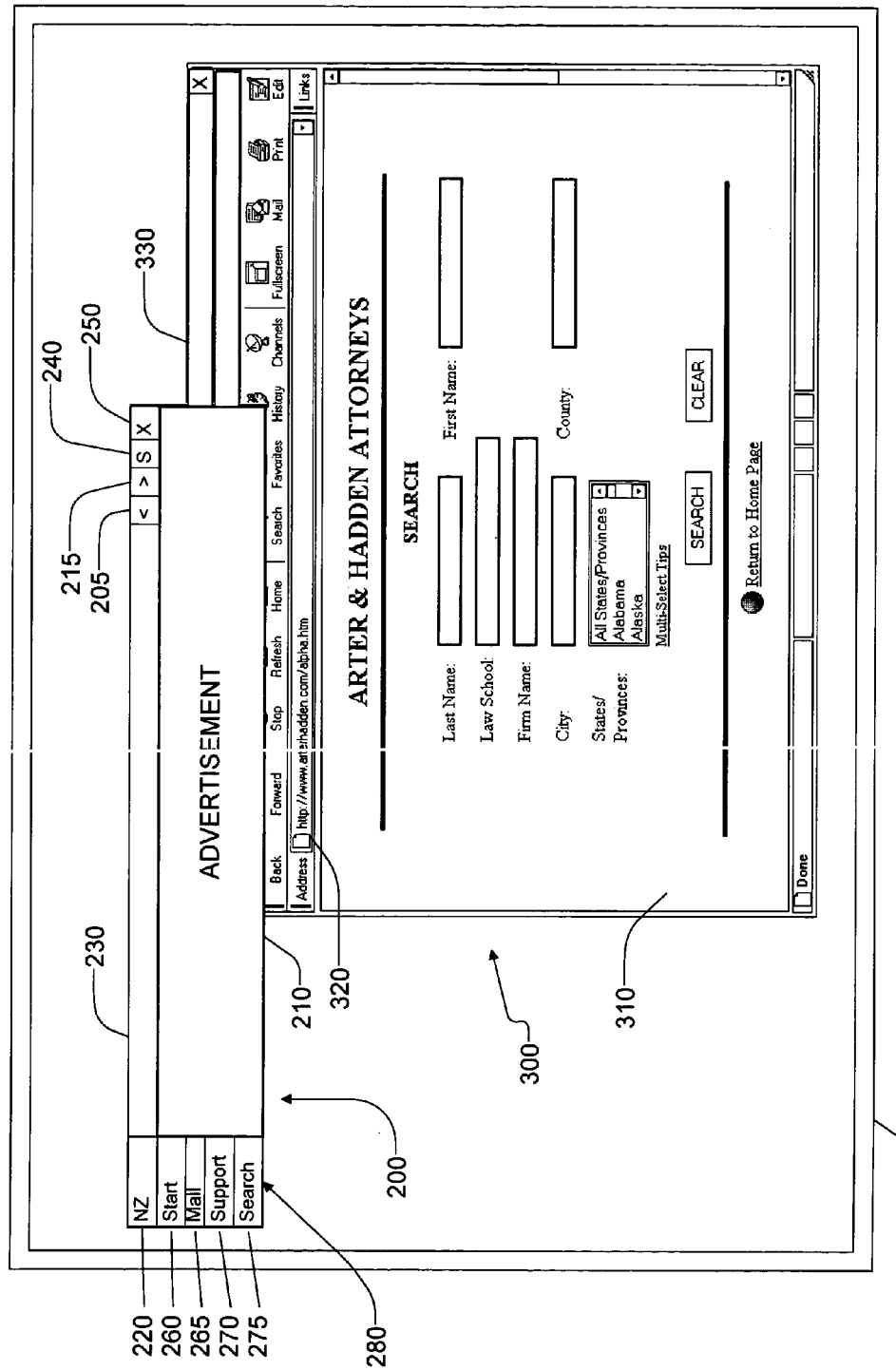
FIG. 3 is a display screen showing the positioning of an Internet client window in accordance with one embodiment of the present invention.

Referring now to FIG. 3, there is shown the display 101 having a Internet client window 200 and a browser window 300. The Internet client window 200 is generated and controlled by the Internet client application 110. The browser window is generated and controlled by the browser application 160, here Microsoft Internet Explorer. The browser window 300 is familiar to those skilled in the art, so the particulars are not described further herein. Further information regarding the use of most browser applications and their technical specifications is abundantly available.

The Internet client window 200 includes a title bar 230, an advertising pane 210, a number of operational icons 205, 215, 220, 240, 250 on the title bar 230, and a number of button bar icons 260, 265, 270, 275 on a button bar 280. The title bar 230 preferably identifies the name of the OSP. The advertising pane 210 is a space in which the Internet client application 110 displays advertisements.

The button bar icons 260, 265, 270, 275 preferably provide one-click access to Web pages and/or menus that might be useful frequently used by to the a user. The online service provider can sell the button bar icons to third parties as an additional revenue source. These icons 260, 265, 270, 275 are associated with particular URLs. The icon 260 is associated with a start page. The icon 265 is associated with an online shopping mall page. The icon 270 is associated with an online technical support page from the online service provider. The icon 275 is associated with an online search engine page. By clicking on any of these icons 260, 265, 270, 275, the Internet client application 110 causes the browser application 160 to load the Web page having the URL associated with the selected icon.

The operational icons 205, 215, 240, 250, 280 on the title bar 230 preferably provide one-click access to operational features of the Internet client application 110. As explained below, the Internet client application 110 maintains records of the advertisements which have been displayed. The cycle back icon 205 allows the user to review advertisements which were previously displayed by the Internet client application 110, in the reverse order in which the advertisements were displayed. If the user has cycled back through advertisements, the cycle forward icon 215 allows the user to review advertisements in the order in which the advertisements were displayed by the Internet client application 110. The search icon 240 provides convenient access to online searching facilities.

The close icon 250 causes the Internet client window 200 to close, and thus also causes the session with the online service to terminate.

The menu icon 280 provides access to a menu of additional menu items and functions. The menu preferably provides alternative and enhanced access to the features associated with the button bar icons 260, 265, 270, 275 and the other operational icons 205, 215, 240, 250. In addition, the menu preferably provides the user with the ability to hide or show the title bar 230 and/or the button bar 280. The menu preferably also allows the user to access and edit his profile. The menu preferably provides the user with the option of positioning the Internet client window 200 at any of a number of predefined positions, such as top left corner of the display 101, top right corner, bottom left corner, or bottom right corner.

The browser window 300 includes a display pane 310, an address bar 320 and a title bar 330. The display pane 310 is a region of the browser window 300 wherein the browser application causes web pages received by the browser application to be displayed. The address bar 320 is another region of the browser window 300 and the browser application displays URLs in the address bar 320 corresponding to the web page currently displayed in the display pane 310. The user can also enter a URL into the address bar 320, and the browser application will attempt to load the web page or other object to which the entered URL points. The primary feature of the title bar 330 is that it displays the title of the browser application. Another feature of most browsers is that the title bar 330 displays the title of the web page then displayed in the display pane 310.

The Internet client window 200 is displayed on top of the browser window 220. Preferably, the Internet client window 200 remains visible and on top of all other windows so long as the communication channel to the OSP server 130 is open. The Internet client application 110 preferably can control the location of the Internet client window 200 on the display 101. For example, the Internet client application 110 preferably allows the user to select one of several predefined locations for the Internet client window 200, such as lower left corner, upper right corner, etc. Some operating systems such as Microsoft Windows permit windows to be moved to the edge of the display 101 so that only a small portion of the window is visible. The Internet client application 110 preferably can also prevent the Internet client window 200 from being moved off of the visible area of the display 101. When the user attempts to hide all or a part of the Internet client window 200, the Internet client window preferably moves the Internet client window 200 to a fully visible area of the display 101.

The Internet client window 200 has a number of characteristics. First, it will generally occupy a relatively small portion of the total display area 101. The exact size, shape, and positioning of the Internet client window 200 within the display area 101 is not important. Second, the Internet client window 200 includes various regions which display data received from the Internet (or other network), and regions which are used as links to Internet (or other network) services.

Figure 4A:
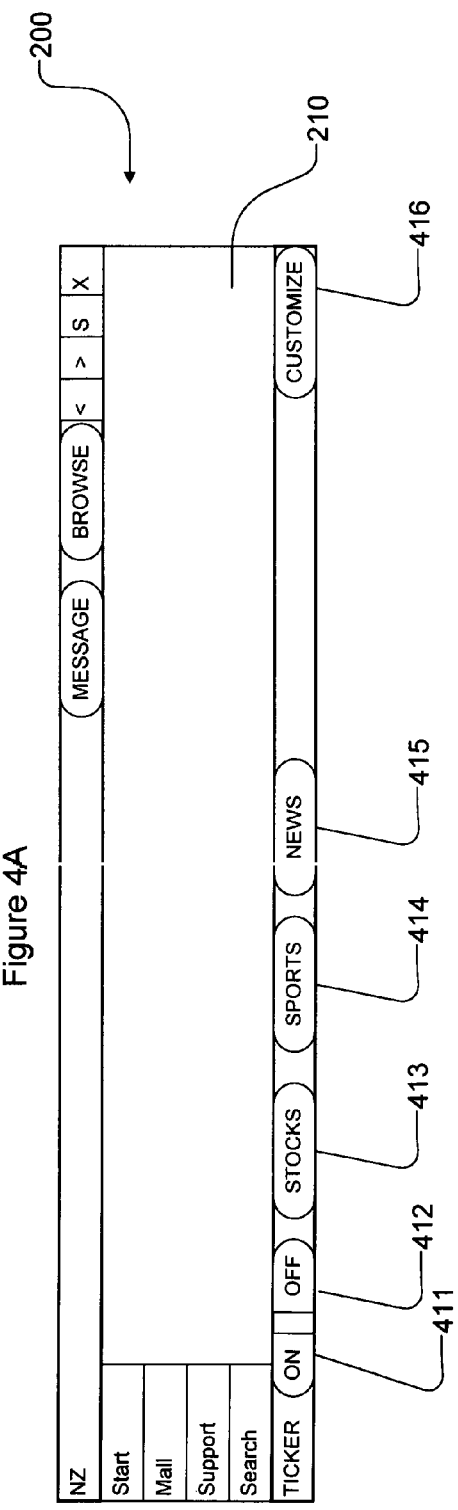
FIG. 4A shows a layout of a Internet client window including a ticker control area in accordance with one embodiment of the present invention.
Figure 4B:
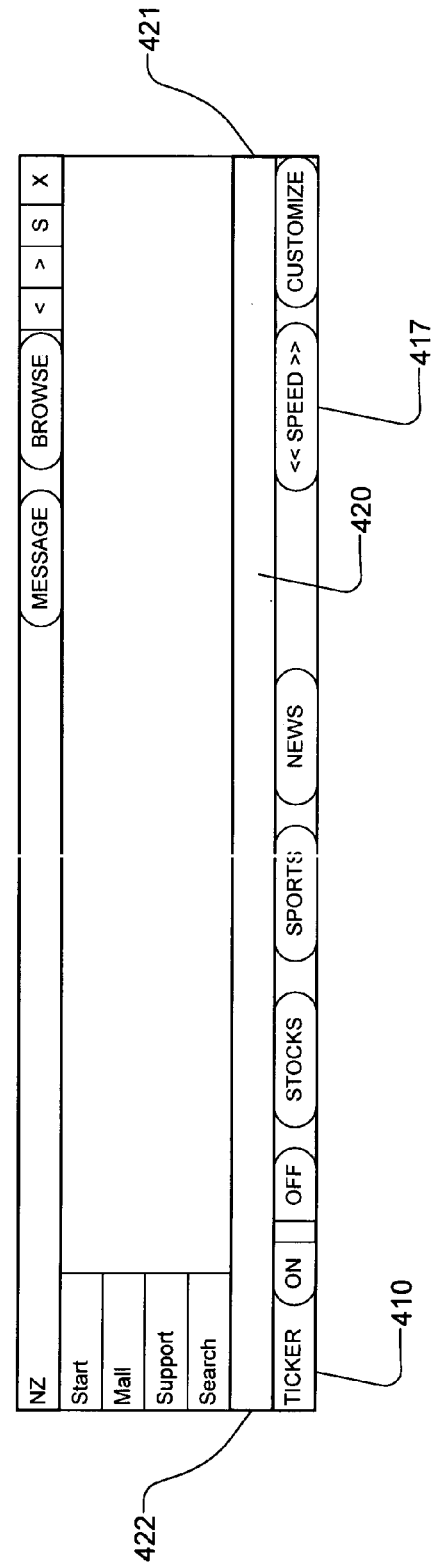
FIG. 4B shows the Internet client window of FIG. 4A, further including a ticker display area.

Referring now to FIGS. 4A and 4B, there is shown a layout of an Internet client window 200 including a ticker control area 410 and a ticker display area 420. The ticker display area 420 has an entry point 421 and an exit point 422. The entry and exit points 421 and 422 are shown at opposite ends of the ticker display area 420, but that is not required.

The ticker control area 410 includes ticker activation buttons 411, 412 and a number of ticker selection buttons 413, 414, 415. These and other buttons described herein are utilized by clicking a mouse cursor thereon in the manner known in the art. The buttons 411 and 412 are used to cause the ticker display area 420 to be displayed (as shown in FIG. 4B) or closed (as shown in FIG. 4A). The ticker control area 410 further includes a customization button 416. The customization button 416 provides the user with the ability to define with particularity the information to be displayed in the respective tickers (stocks/sports/news). Other customization features can also be made accessible from the customization button 416.

The ticker selection buttons 413, 414, 415 allow the user to select the type of ticker to be displayed. FIGS. 4A and 4B show ticker selection buttons for three ticker types: stocks, sports and news. According to one embodiment, each ticker selection button is associated with a particular provider of data. In such an embodiment, the identity or branding of the ticker data provider may also appear on or in association with the respective ticker selection button. In other embodiments, the ticker selection buttons may have generic labels, with the respective ticker data being obtained from one or more sources. Accordingly, in this description, "ticker type" refers to a single type of data (e.g., stocks, sports, news) which comes from a single data provider. However, the terms is also broad enough to refer to a single type of data from multiple sources.

The ticker display area 420 is used to display various ticker data as will be described in more detail shortly. In one aspect of the present invention, the ticker data is displayed in the ticker display area 420 in a moving and continuous manner, from right to left. Thus, the ticker data appears to enter the ticker display area 420 at entry point 421 on the right side of the ticker display area 420, and exits at exit point 422 on the left side thereof. The ticker data appears to move from right to left because people usually read from left to right, and this scroll direction has the ticker data scrolling toward the user's eyes, not away from them. However, if the user is accustomed to reading from right to left (e.g., Hebrew), then the scrolling direction would be preferably left to right. The scroll direction is set by default, though the Internet client application could permit the user to select the scroll direction, for example through a check box accessed from the customization button 416.

The speed at which ticker data appears to move may vary and can be modified by use of a speed and direction selection control 417 within the ticker control area 410.

Various formatting may be applied within the ticker display area 410. This formatting includes, for example, font, color, size, flash, bold, italics, underline and other display and audio characteristics. The various characteristics may be associated with various ticker data depending on the ticker types and ticker fields with which the ticker data is associated, upon the number of ticker types being simultaneously displayed, and upon other factors including user preferences or selections.

For example, in a situation wherein ticker data associated with multiple ticker types is being displayed, it might be desirable to display the ticker data associated with the first ticker type in a first color, and the ticker data associated with the second ticker type in a second color so a viewer can quickly and easily process the various sets of ticker data substantially simultaneously. Similarly, the speed, direction, font size, and other characteristics might also be adjusted for various ticker data for the same reasons. Another reason to distinguish ticker data might be to identify hypertext from non-hypertext, even within the same set of ticker data. In another embodiment of the present invention involving promotions or advertising, some ticker data, perhaps even a single piece, may be set apart from the other ticker data to signify a unique sale or sweepstakes entry associated therewith.

In practice, displaying a single ticker type at a time appears to be preferred. However, ticker data of plural ticker types may be combined in a single ticker display area.

Alternatively, if the user wishes to view several types of tickers at the same time, a separate ticker display area may be provided for each desired ticker type. In a similar way, a single ticker display area such as ticker display area 420 may be subdivided for each respective desired ticker type.

Figure 5A:
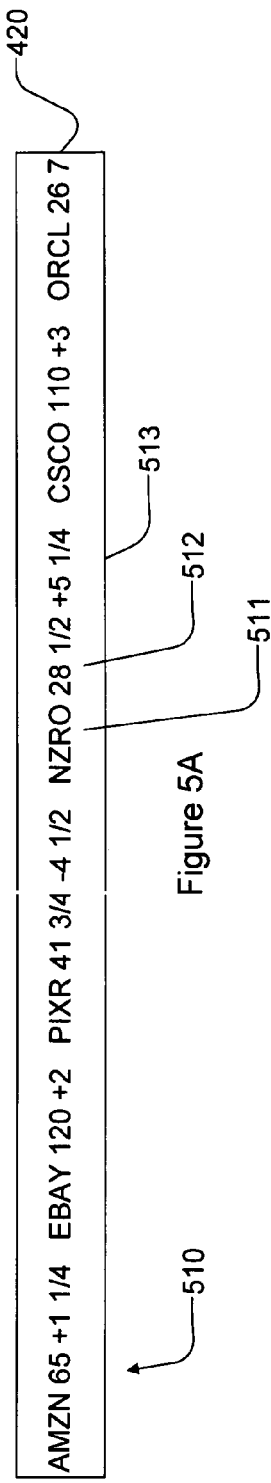
FIGS. 5A-5C each show a ticker display area displaying various ticker data.
Figure 5B:
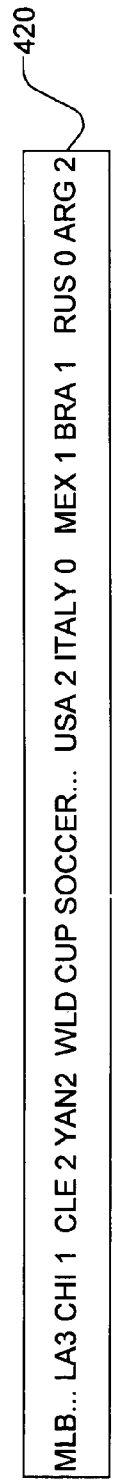
Figure 5C:

FIGS. 5A, 5B and 5C show snapshots of ticker display areas 420 having ticker data. Each type of ticker can have particular desirable characteristics which are described further below. Portions of ticker data are referred to herein as "ticker message units." A ticker message unit corresponds to one complete nugget of information (e.g., object) in the ticker, along with corresponding hyperlinks and formatting. A ticker message unit can include URL, which is used by the client application 110 to retrieve additional information when the display in the ticker display area 420 associated with the URL is clicked on by the user.

One of the beneficial aspects of the invention is that displays of ticker data may function as hyperlinks. That is, a user may click on or otherwise "activate" ticker data displayed in the ticker display area 420. The client window would then cause the information associated with the hyperlink to be displayed. The ticker message unit includes a hyperlink field. The hyperlink field can include a URL, a string which is used to form a URL, or other instructions. Alternatively, when the user clicks on a displayed unit of ticker data, the client application 110 can use the selected ticker data to determine what additional content to display, or this determine may be made by the OSP server 130.

FIG. 5A shows ticker data associated with a financial ticker type in the ticker display area 420. The ticker message unit for a stock includes the stock symbol 511, a price for that stock 512, and the change in price 513 (e.g., since previous market close). The user can select which financial information appears in his stock ticker. Thus, the stock ticker might include quotes for selected stocks and other securities, market indexes (e.g., Dow Jones, Nasdaq, S&P 500 and NYSE composite), and financial news. Other information may also be included in the stock ticker display, such as the length of any delay in the quotes. If a stock price is up, the ticker data for the corresponding stock is displayed in green. Likewise, down prices are displayed in red. Other colors may also be used to distinguish changes, with color variations used to further show differences. For example, large losses might be shown in a brighter red than smaller losses.

FIG. 5B shows ticker data associated with a sports ticker type in the ticker display area 420. The user can select which sports information appears in his sports ticker. Thus, the sports ticker might include scores, statistics and other sports news for particular sports, leagues, teams, and geographic regions.

FIG. 5C shows ticker data associated with a news ticker type in the ticker display area 420. The user can select which news appears in his news ticker. Thus, the news ticker might include headlines, business, entertainment, local, national, world, technology or other types of general or specific news.

In addition to the user-selectable information, additional information may be displayed in the tickers display area 420. For example, the provider of the ticker data may wish to insert messages, including advertisements into the scrolling ticker display. One example of a sports ticker display might read. "LA Lakers 101/San Antonio 98—Footlocker.com has the latest Nike Air Jordans 50% off—IN Pacer 103/NY Nicks 100." Like Other ticker message units, such provider-inserted messages may also have an associated URL for hyperlinking.

Methods of the Invention

Figure 6:
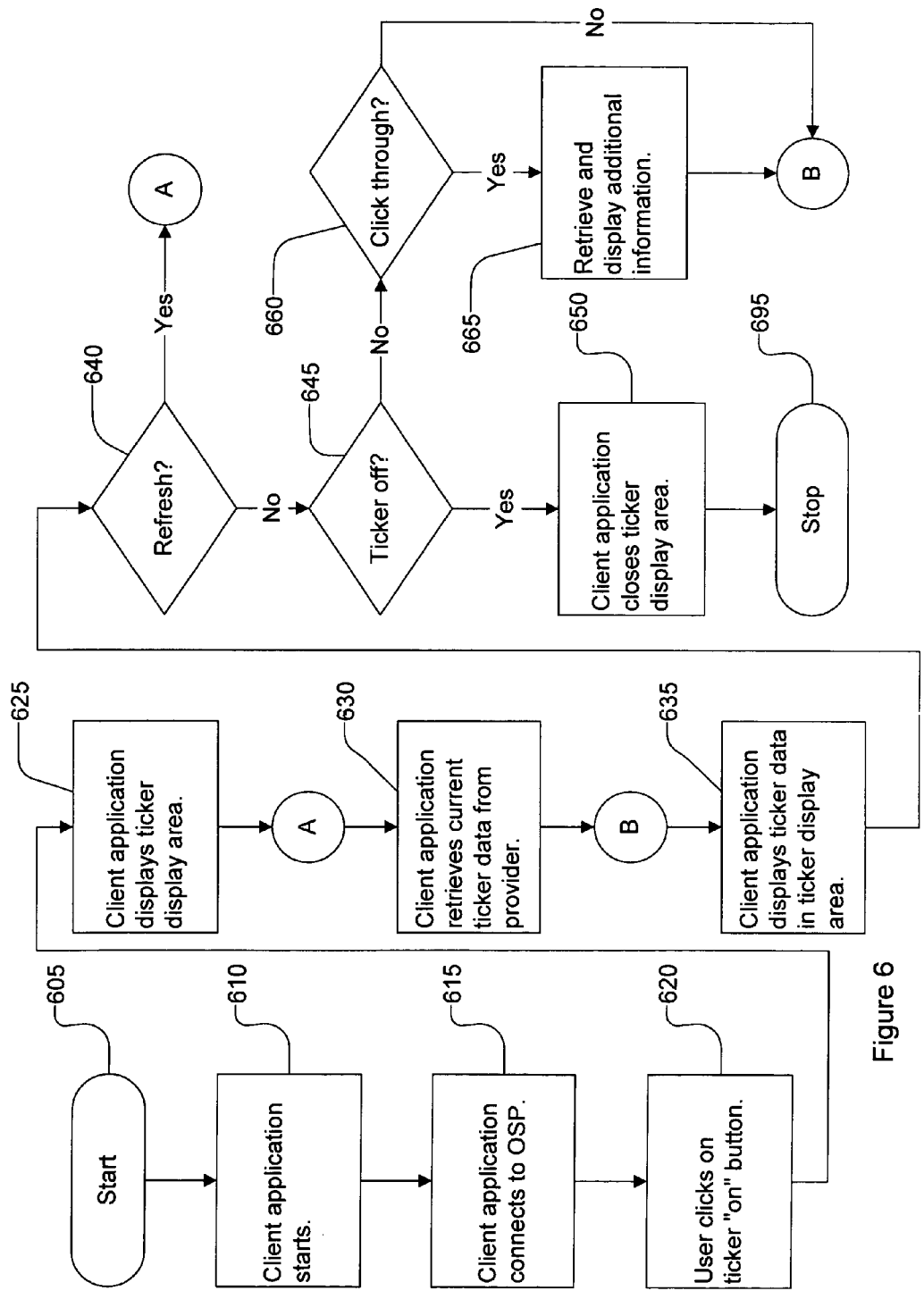
FIG. 6 is a flowchart of a client device displaying a ticker in accordance with the present invention.

Referring now to FIG. 6 there is shown a flowchart of a client displaying a ticker in accordance with the present invention. The method begins (step 605) with the client application 110 activating on the client device (step 610). The client application 110 may be activated either manually or automatically.

At some point, the client application 110 establishes a communication line to the data access network 120 (step 615). For dial-up connections, a communication link is first established, then the OSP server 130 authorizes access as described in the related applications. The logical link between the client application 110 and the OSP server 130 may utilize TCP/IP or other protocols.

The client application 110 at some point displays the client window 200. This may be done before or after the communication line is established. In some embodiments, such as free or low-cost Internet access service, the client window remains fully displayed so long as the communications line is established. For some Internet services, such as DSL or cable modem, it may be desirable to display the client window so long as the communications line is active and for a predetermined period thereafter.

With the client window 200 opened, the ticker display area 420 of the client window 200 can be activated (step 625). This may be done by the user clicking on the "on" button 411, through some other manual operation, or can also be done automatically, such as when the client window 200 is opened. Similarly, the ticker display area 420 may be closed (step 650) if the user clicks on the ticker "off" button 412 (step 645). The ticker display area 420 could also be closed automatically, such as after a period of time. Closing the ticker display area may be consider the end (step 695).

The client application 110 needs ticker data to display, and obtains the ticker data from either the OSP server 130 or from a web server 150 designated by the OSP. Most ticker data is time sensitive, so the client application 110 needs to have the provider provide current ticker data. The client application 110 receives ticker message units including ticker data from the provider via the data access network 120 (step 630). The transfer of the ticker data may be initiated by the client application 110, the OSP server 130 or, if the ticker data is coming from the web server 150, from the web server 150.

The client application 110 scrolls the ticker data through the ticker display area 420 (step 635). As mentioned, the ticker data generally needs to be refreshed periodically (step 640). The refresh decision may be made by the client application 110 or otherwise. The refresh timing may be fixed (e.g., every 5 minutes), or variable. For a variable refresh, the ticker data itself may include or suggest its sensitivity the passage of time. Furthermore, the provider of the ticker data or the OSP server 130 may suggest refresh. One reason to refresh ticker data (step 640) is that the user has clicked on one of the ticker selection buttons 413, 414, 415.

As describe above, displays of ticker data may have the characteristics of hyperlinks. The respective ticker message units include click-through instructions. Thus, when the user clicks on ticker data displayed in the ticker display area 420 (step 660), the client application can display the web page or other content associated with the ticker data (step 665). In practice, the client application 110 can cause this content to be displayed in an open or new browser window, or in the advertising pane 210 of the client window 200.

There are a number of ways to accomplish having the additional content displayed by the client device 100. One of these ways is for the client application 110 to pass certain information to the ticker data provider. The ticker data provider then sends back to the client application the specific URL or other instructions for retrieving the additional content. In deciding what additional content to display, profile information about the user can be useful. This profile information can be provided by the client application 110 or the OSP server 130. For example, the profile fields might include: age, gender, income, education, city, state, zip, marital status, number of children, primary language, industry and occupation.

The ticker provides a number of monetization avenues. For example, displays in the ticker display area 420 may include advertisements. Furthermore, these advertisements can include hyperlinks to e-commerce functionality. The OSP and the ticker data provider can obtain a commission for ensuing e-commerce. Another monetization avenue is for ticker click-throughs to trigger ad missiles (i.e., targeted ads), either in the advertising pane 210 or a browser window. Furthermore, by monitoring a user's web browsing, the display in the ticker display area 420 may be adjusted. For example, if the user is browsing a web site for a particular sports team, the ticker data provider can provide current scores for that team or others in the same league or same city, to urge the user to browser a related web site, or to advertising team-branded products or tickets.

Figure 7:
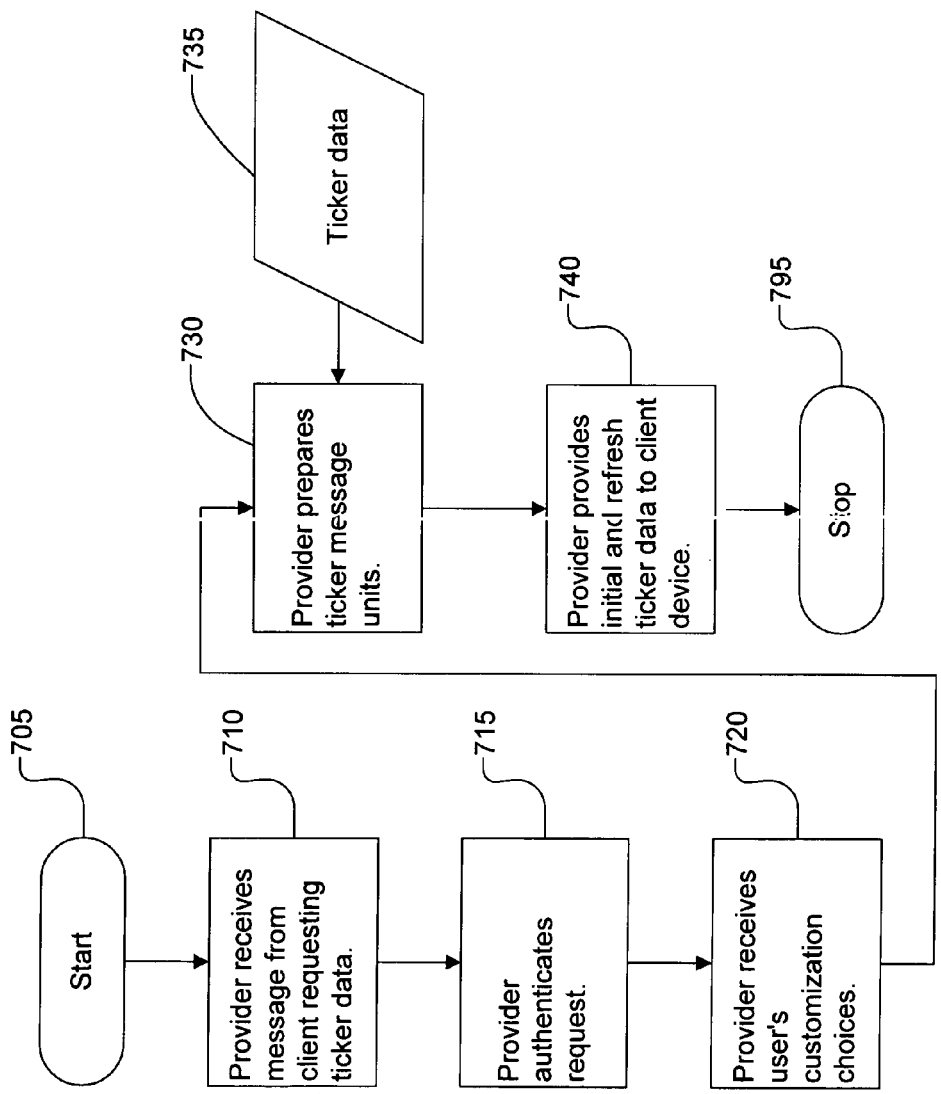
FIG. 7 is a flowchart of a server providing ticker data to a client in accordance with the present invention.

Referring now FIG. 7 there is shown a flowchart of a server providing ticker data to a client in accordance with the present invention. After the method starts (step 705), the provider receives a message requesting ticker data for the client device 100 (step 710). In one embodiment, this request comes directly from the client application 110. In another embodiment, the request comes from the OSP server 130 based upon some event recognized by the OSP server 130.

Depending on the network topology, it may be desirable for the provider to authenticate the request for ticker data (step 715).

In general, it is more efficient for the provider of ticker data to send only the ticker data which the user has selected to view. Thus, at some point the provider needs to receive the user's ticker data customization choices (step 720). Alternatively, there could be a division of labor between the provider and the client application 110, with the provider selecting certain ticker data to send to the client application 110, and the client application filtering this to conform with the user's customization choices.

As explained above, the provider periodically sends ticker message units to the client application 110 (step 730). To accomplish this, the provider typically will obtain information from numerous sources, aggregate it and synthesize the data into a form ready for the users.

With the ticker message units prepare, the provider then establishes a communications link with the client device, and provides the ticker data to the client device 100 (step 740). This process then repeats to refresh the ticker data stored by the client device 100.

Figure 8:
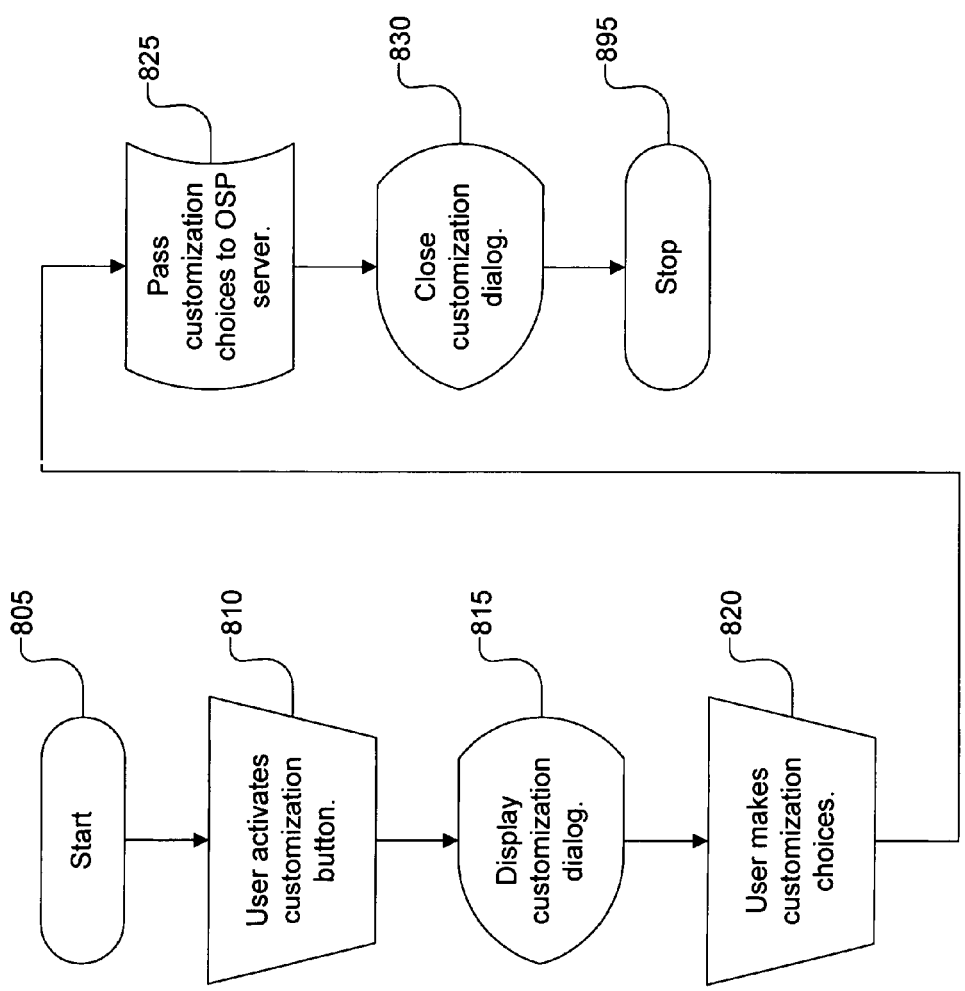
FIG. 8 is a flowchart of user customization of ticker displays in accordance with the present invention.

Referring now to FIG. 8 there is shown a flowchart of user customization of ticker displays in accordance with the present invention. As can be seen, customization is a beneficial aspect of the invention. To customize the ticker data, the user interacts with the client application (step 805). In the disclosed embodiment, the user first clicks on the customization button 421 (step 810). Next, the client application 110 displays a customization dialog (step 815). The customization dialog comprises a combination of fixed and variable matter. The fixed matter includes the headings and prompts. The variable matter includes the available ticker types, and the available categories, classes and specific information available for selection by the user.

After the user makes his customization choices (step 820), the customization choices, or at least some subset of those choices, are passed to the provider as described above (step 825). In one embodiment, the customization choices are stored by the OSP server 130. The OSP server 130 then provides the relevant customization choices to the web server 150 acting as the provider for a particular ticker type. This technique affords more security, privacy and control for the OSP. That is, the OSP is easily able to change third party ticker data providers.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

It is claimed:

1. A method of displaying information on a client device connected to a data access network using an Internet client application, the method comprising:
    a) the Internet client application activating on the client device, the Internet client application operating concurrently with other applications including an Internet browser;
    b) the Internet client application initially establishing a communication channel to the data access network with an online service provider to obtain Internet access for the client device;
    c) the Internet client application displaying a client window on a display coupled with or included in the client device, the client window remaining fully visible and on top of all other windows so long as the communication channel remains open;
    d) the Internet client application activating a ticker display area of the client window;
    e) the Internet client application receiving plural ticker message units including ticker data from the online service provider via the data access network, the ticker data for display in the ticker display area, wherein the ticker data includes advertisements and at least one selected from the group including stock information, sports information, news information, wherein some of the ticker message units include click-through instructions including a uniform resource locator (URL) of a web page associated with the ticker data;
    f) the Internet client application scrolling the ticker data through the ticker display area;
    g) the Internet client application receiving user selection of one of the ticker data in the ticker display area;
    h) in response to the receiving the Internet client application receiving the user selection of one of the ticker data in the ticker display area, the Internet client application causing the web page identified by the URL to be displayed in a browser window of the Internet browser on the client device concurrently while the Internet client application continues displaying the client window including the ticker data in the ticker display area such that both the web page and the client window are visible.

2. The method of displaying information on a client device of claim 1, wherein the client window has an entry point and an exit point associated therewith, and wherein the Internet client application displays the ticker data such that the ticker data appears to enter the ticker display area at the entry point and appears to exit the ticker display area at the exit point.

3. The method of displaying information on a client device of claim 1, wherein the Internet client application periodically receives updated ticker message units from the online service provider.

4. The method of displaying information on a client device of claim 1, wherein the online service provider comprises a server on the Internet.

5. The method of displaying information on a client device of claim 1, wherein the client window includes plural ticker type buttons.

6. The method of displaying information on a client device of claim 5, the method further comprising:
    the Internet client application receiving user selection of one of the ticker type buttons, and in response thereto the Internet client application displaying ticker data of a type corresponding to the selected ticker type button in the client window.

7. The method of displaying information on a client device of claim 6, wherein the ticker types include stocks, news and sports.

8. The method of displaying information on a client device of claim 6, wherein the Internet client application displays only a single type of ticker data at a time.

9. The method of displaying information on a client device of claim 6, wherein the Internet client application displays plural types of ticker data at a time.

10. The method of displaying information on a client device of claim 9, wherein the ticker display area comprises plural sub-areas, and the Internet client application displays the ticker data of each type in one of the sub-areas.

11. The method of displaying information on a client device of claim 1, wherein available ticker data is of plural ticker types, the method further comprising:
    the Internet client application receiving user selection of one of the ticker types, and in response thereto the Internet client application displaying ticker data of the selected type in the client window.

12. The method of displaying information on a client device of claim 1, further comprising the step of hyperlinking to a web site in response to activation of the ticker data.

13. The method of displaying information on a client device of claim 12, wherein the hyperlinking causes data from the web site to be displayed within the client window.

14. The method of displaying information on a client device of claim 1, wherein the ticker data is scrolled through the ticker display area at a scroll speed, and the client window further includes a scroll speed control; the method further comprising the Internet client application recognizing user manipulation of the scroll speed control to change the scroll speed.

* * * * *